Figure 1:
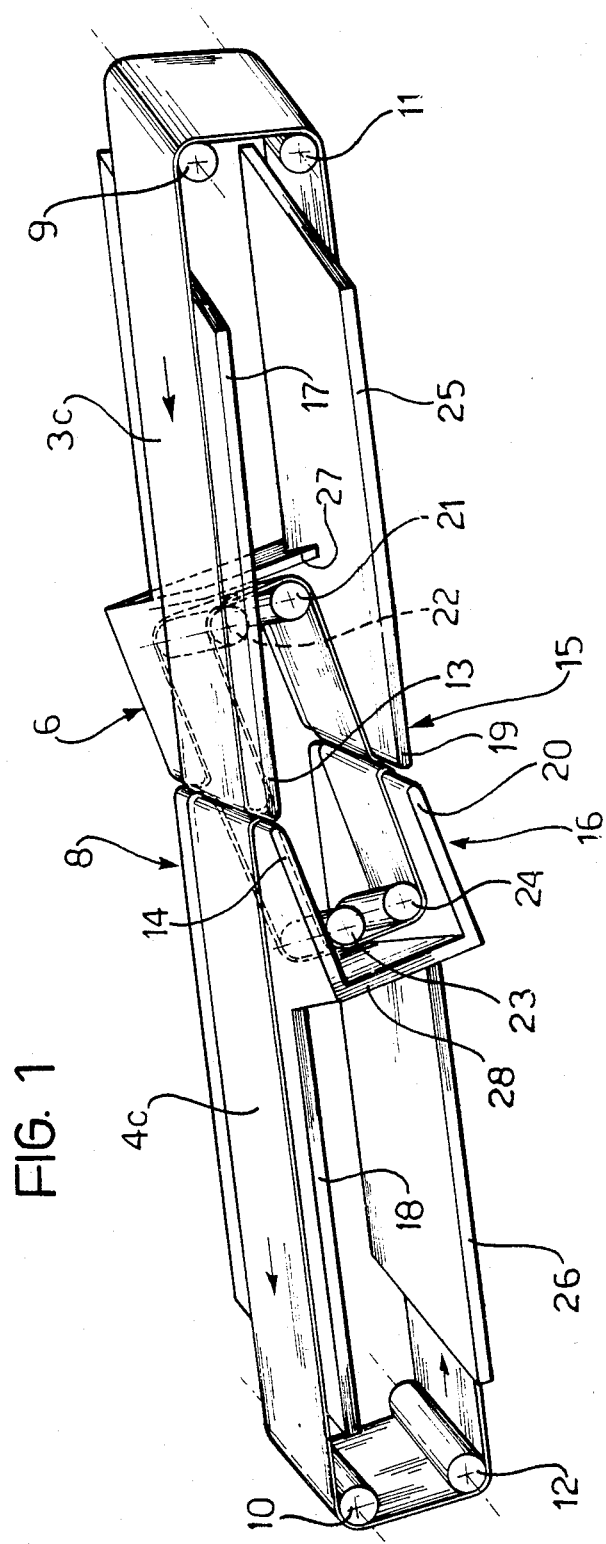

United States Patent [19]

Francioni

[11] Patent Number: 4,648,504
[45] Date of Patent: Mar. 10, 1987

[54] CONVEYOR DEVICE WITH TWO BELTS FOR SWEET PRODUCTS

[75] Inventor: Renzo Francioni, Grignasco, Italy

[73] Assignee: Cavanna S.p.A., Prato Sesia, Italy

[21] Appl. No.: 628,990

[22] Filed: Jul. 9, 1984

[30] Foreign Application Priority Data

Jul. 26, 1983 [IT] Italy ............................... 22496/83[U]

[51] Int. Cl.[4] ............................................ B65G 37/00
[52] U.S. Cl. .................................... 198/606; 198/839
[58] Field of Search ............... 198/606, 457, 471, 602, 198/839, 482, 817; 271/198, 202, 275

[56] References Cited

U.S. PATENT DOCUMENTS

| 1,848,162 | 3/1932 | Cone | 198/784 X |
| 2,128,594 | 8/1938 | Rasmussen | 198/815 |
| 3,944,044 | 3/1976 | Hamy | 198/833 X |

Primary Examiner—Joseph E. Valenza
Assistant Examiner—Jonathan D. Holmes
Attorney, Agent, or Firm—Robbins & Laramie

[57] ABSTRACT

A conveyor device has two endless conveyor belts extending in alignment and advancing in the same direction of (X—X), the adjacent ends of the belts being oriented diagonally with respect to the direction. During transfer between the two belts the products gradually abandon the first belt and pass gradually onto the second belt. This avoids any stumbling of the products, even when these are of narrow and elongate form.

4 Claims, 2 Drawing Figures

CONVEYOR DEVICE WITH TWO BELTS FOR SWEET PRODUCTS

The present invention relates to a conveyor device of the type comprising two endless aligned and adjacent conveyor belts tensioned between respective drive means and return means and having the same direction of advance, particularly for transporting long, narrow sweet products arranged transversely with respect to the said direction of advance.

Conveyor devices of the type specified are, as is known, widely used in the manufacture of sweet products and the like, for example for connecting an operating machine in which the products are prepared and a machine in which they are wrapped.

It is known that such devices are not used solely for transporting products, but must also ensure that they are spaced apart at a predetermined interval, compatible with the wrapping machine.

This is effected by imposing small velocity differences on the individual belts which form the device, according to various known methods.

Such devices are only used in cases where the sweet products have to be conveyed over long distances such as cannot be spanned by a single belt.

In this case the device comprises two belts, or possibly more belts, in order to span the desired distance.

Although such devices are generally satisfactory for the purposes indicated they nevertheless have a recognised disadvantage which is apparent when the products to be transported are narrow and long, and, as in general occurs, are disposed on the conveyor belt transversely to the direction of advance of the said belt.

In this case, upon transfer from one belt to the successive belt the products stumble and can even become overturned on the successive belt.

In order to minimise these disadvantages it has been proposed to reduce the diameter of the rollers around which the belts pass, or to pass the belts around the edges of plates of small thickness.

These edges are commonly called "feathers" by those skilled in the art, and this term will from now on be adopted in the following description and in the claims.

The reduction of the diameter of the rollers is, however, difficult to reconcile with the rigidity of the said rollers, and the need to support them rotatably with suitable bearings.

Similarly, the thickness of the feathers cannot be too small, as otherwise the belt would be subjected to excessive bending stress.

In consequence the amelioration of the cited disadvantages gives rise to other difficulties no less serious.

In order to avoid the said disadvantages in a radical way it has also been proposed to sub-divide each belt longitudinally into three belt elements side-by-side and to extend the central belt element of a first belt between the two lateral belt elements of a second belt into which it is axially displaced.

In this way there is provided a continuous support plane for the product along its entire travel even during its transfer from one belt to the successive belt of the conveyor device.

This solution, however, while avoiding the disadvantages mentioned, is structurally complex and in practice almost impossible to achieve.

The object of the present invention is to provide a device of the type specified having structural and functional characteristics such as to overcome the disadvantages mentioned with reference to the prior art.

This object is realised by a device of the type specified which is characterised in that, in correspondence with the said return means, the said belts have adjacent ends oriented diagonally with respect to the said direction of advance.

To advantage each of the said return means comprise a feather oriented diagonally with respect to the said direction, as well as means for realigning the belt.

Further to advantage the said belt realignment means comprise a further feather extending parallel to the said feather and at least one roller for th said belt between the said feather and the said further feather.

Figure 2:
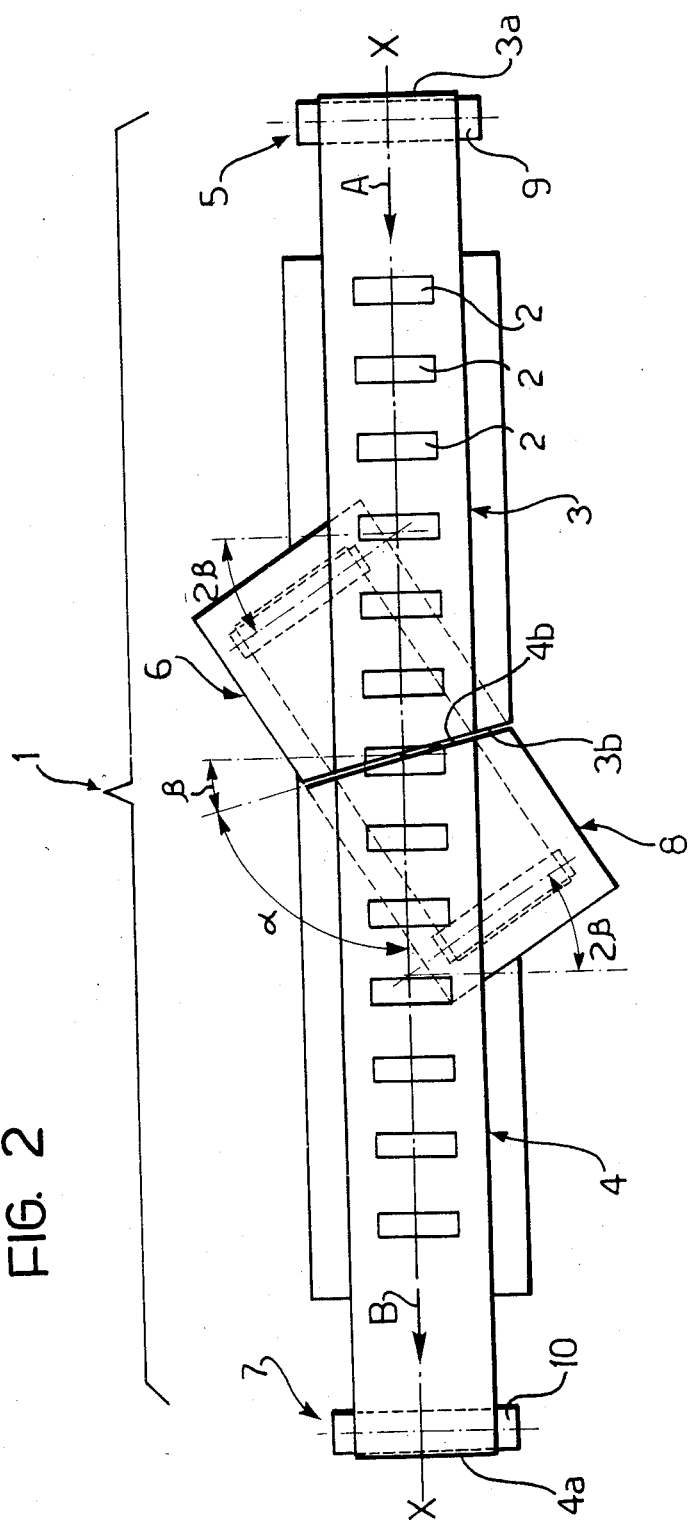

The characteristics and advantages of the device according to the present invention will become apparent from the description which follows referring to its preferred embodiment, given by way of non-limiting example, with reference to the appended drawings, in which:

FIG. 1 shows a perspective view of a device according to the present invention, and FIG. 2 shows a plan view of the device of FIG. 1.

With reference to the accompanying drawings, reference numeral 1 indicates generally a conveyor device particularly for conveying long, narrow sweet products, all indicated by 2.

The conveyor device 1 comprises two endless conveyor belts 3 and 4, aligned with and adjacent each other, having the same line of advance, indicated by X—X and the same direction of advance, indicated by the arrows A and B.

The belt 3 is tensioned in a support frame, not shown of the conveyor device 1, between drive means 5 and return means 6, disposed at its two ends 3a and 3b.

The belt 4 is tensioned in the said support frame between drive means 7 and return means 8, disposed at its two ends 4a and 4b.

The belts 3 and 4 have respective active passages 3c and 4c, lying in a horizontal plane on which the sweet products 2 are disposed at regular intervals, transversely with respect to the said direction X—X.

The return means 6 and 8 are disposed at the adjacent ends 3b and 4b of the belts 3 and 4 while the drive means 5 and 7 are disposed at the opposite ends 3a and 4a of the said belts, which also constitute the ends of the conveyor device 1 as a whole.

The drive means 5 and 7 are substantially identical and comprise respective motorised rollers 9 and 10 rotatably mounted in the support frame.

Reference numerals 11 and 12 indicate rollers freely rotatably mounted in the support frame, parallel to the rollers 9 and 10 and below the latter.

In the conveyor device 1 according to the invention the belts 3 and 4, are more particularly the active passes 3c and 4c of the said belts 3 and 4, have their adjacent ends 3b and 4b at the return means 6 and 8 oriented diagonally with respect to the direction of advance X—X.

In the example illustrated an angle $\alpha$ is formed with the direction X—X, equal to 80°. The complementary angle to the angle $\alpha$ is indicated by $\beta$ in FIG. 2.

For this purpose the return means 6 and 8 include respective contraposed and parallel feathers 13 and 14, oriented diagonally with respect to the direction X—X of the said angle $\alpha$, about which the belts 3 and 4 are respectively turned, and further include respective alignment means 15 and 16 for the belts 3 and 4.

The feathers 13 and 14 comprise rounded edges of two respective thin plates 17 and 18 extending horizontally below the active passes 3c and 4c and supported rigidly by the support frame.

The realignment means 15 and 16 comprise respective further feathers 19 and 20 extending parallel to the said feathers 13 and 14 below the latter.

Reference numerals 21 and 22 indicate two rollers, for the belt 3 between the feathers 13 and 19, freely rotatably mounted in the support frame, parallel to each other.

The rollers 21 and 22 have their axes inclined at an angle $2\beta$ to the perpendicular to the direction X—X.

Similarly, reference numerals 23 and 24 indicate two rollers, for the belt 4 between the feathers 14 and 20, freely rotatably mounted in the support frame, parallel to each other.

These rollers 23 and 24 are also parallel to the rollers 21 and 22.

The feathers 19 and 20 comprise rounded edges of two respective thin plates 25 and 26 extending horizontally below the said plates 17 and 18 respectively, and rigidly supported by the said support frame.

Reference numerals 27 and 28 indicate two vertical walls, parallel to each other, disposed outside the rollers 21, 22 and the rollers 23, 24 with respect to the ends 3b and 4b respectively.

The wall 27 rigidly connects the plate 17 with the plate 25 while the wall 28 rigidly connects the plate 18 with the plate 26.

The belt 3 is turned around the feather 13 and over its rollers 21 and 22, and then turns again around the feather 19.

Similarly, in a substantial mirror-image arrangement, the belt is turned around the feather 14 and over the rollers 23 and 24 and then turns again around the feather 20.

During operation of the device 1, and as a result of equal speed or a slight difference in speed of the belts 3 and 4, the products 2 advance on the belt 3 in the direction indicated by the arrow A.

When a product 2 arrives at the end 3b of the belt 3 it gradually abandons the belt by virtue of the diagonal orientation of the said end of the belt, and in the same measure gradually passes onto the belt 4; halfway in its transfer the product 2 will have one end still resting on the belt 3 while its other end rests on the belt 4.

When the product 2 is entirely resting on the belt 4 it will continue its advance in the direction indicated by the arrow B.

In the conveyor device according to the invention all stumbling of the products is completely eliminated, even in the case of narrow products, in their transfer between adjacent belts.

In fact, by virtue of the diagonal orientation of the adjacent ends of the belts, each product, halfway in its passage from one belt to the successive belt, will be half supported on one belt and half supported on the other belt.

A further advantage of the conveyor device according to the invention resides in the fact that the plates, the edges of which form the feathers, may have a substantial thickness without thereby causing stumbling of the products. As a result the stress on the belt when the latter turns around the feathers is limited.

It should also be noted that in several cases, the feathers could also be replaced by rollers suitably supported for free rotation and axially retained by the support frame of the conveyor device.

Obviously the device described above may be embodied with many modifications and variants by a skilled technician in the art in order to meet other specifications and contingencies, all of which are nevertheless comprehended within the scope of protection of the present invention as defined in the following claims.

I claim:

1. A conveyor device including at least two longitudinally aligned endless conveyor belts having the same direction of advance, for conveying along said belts from one to the other in the direction of advance relatively long, narrow articles transversely disposed on said belts, said belts being endwise aligned and adjacent each other, and respective drive and return means between which each of said belts are tensioned, opposed ends of said belts being adjacent each other and supported by said return means, adjacent ends of said belts being oriented at an angle relative to the direction of advance, each of said return means being formed of a pair of spaced upper and lower plate means and an integral connecting wall means, each of said spaced plate means including a feather oriented diagonally with respect to the direction of advance, and at least one roller means interposed between said feathers, the roller means being oriented at twice said angle, one of said feathers smoothing transition of an article from one belt to the other, and the roller means and the other of said feathers realigning the belt.

2. A conveyor device as claimed in claim 1 wherein the angle is about 10° measured from a line normal to the direction of advance.

3. A conveyor device as defined in claim 1 wherein the other feather comprises a roller.

4. A conveyor device as defined in claim 1 wherein the connecting wall means is transverse to the plate means.

* * * * *